United States Patent [19]

Farrentine

[11] Patent Number: 5,009,329

[45] Date of Patent: Apr. 23, 1991

[54] DISPENSING APPARATUS

[76] Inventor: Anselmo N. Farrentine, 1368 Pyramid Dr., Las Vegas, Nev. 89108

[21] Appl. No.: 423,022

[22] Filed: Oct. 18, 1989

[51] Int. Cl.[5] .................................... B65G 59/00

[52] U.S. Cl. .................................... 221/175; 221/178; 221/192; 221/226; 312/45

[58] Field of Search ............... 221/175, 178, 191, 192, 221/251, 268, 271, 266; 312/111, 183, 253, 243, 45; 211/10; 414/589, 919

[56] References Cited

U.S. PATENT DOCUMENTS

| | | | |
|---|---|---|---|
| 1,004,998 | 10/1911 | Crecelius | 221/261 |
| 1,446,381 | 2/1923 | Dent | 221/269 |
| 2,238,725 | 4/1941 | Fry | 221/238 |
| 2,296,154 | 9/1942 | Elliott, Sr. | 221/114 |
| 2,496,304 | 2/1950 | Muffly | 62/201 |
| 2,956,660 | 10/1960 | Nordquist | 221/6 X |
| 3,254,792 | 6/1966 | Danielson et al. | 221/191 X |

*Primary Examiner*—H. Grant Skaggs
*Assistant Examiner*—Tuan N. Nguyen
*Attorney, Agent, or Firm*—Trask, Britt & Rossa

[57] ABSTRACT

An apparatus for dispensing articles is disclosed. The apparatus includes a storage rack associated with a vertically disposed conduit proximate an outlet of the storage rack. A carriage adapted for a manual or spring-assisted upward and downward displacement within the conduit is configured to receive an article from the storage rack. A finger member mounted within the channel is formed to permit an upwardly directed passage thereby of an article loaded carriage and operates subsequently to unload that carriage of its article and thereafter retain that article within that channel at a location elevationally above the finger member.

16 Claims, 4 Drawing Sheets

DISPENSING APPARATUS

BACKGROUND OF THE INVENTION

1. Field

This invention relates to apparatus for storing and dispensing articles. More particularly, the invention is directed to apparatus for dispensing articles capable of rolling displacement under the force of gravity when placed on an inclined surface.

2. State of the Art

Many marketing, distribution or manufacturing activities involve the storage of articles and the subsequent provision of those articles on an individual basis. Further, many articles, such as certain types of beverages, e.g., beer, require rotation in order to maintain freshness and avoid the complications which may arise from settling.

Many attempts have been made previously to provide apparatus for storing a quantity of an article, e.g. bottled or can beverage, rotating the article during storage, and subsequently retrieving those articles one at a time. Representative of these attempts is the disclosure of U.S. Pat. No. 2,496,304 (Muffly) which describes a storage system constituted by a vertical array of inclined chutes oriented to define a circuitous and sinuous pathway. A conveyor chain is fitted with a plurality of cup-shaped members at spaced intervals along the length of the chain. The chain being trained over a pair of toothed gear drums is adapted for retrieving bottles on an individual basis from the storage racks and subsequently raising them to an unloading platform.

U.S. Pat. No. 1,446,381 (Dent) discloses a linkage fitted handle and an elevator mechanism adapted to receive and transfer a bottle from a platform retained row of bottles.

A piston-like retrieval system adapted for retrieving a single cartridge from a storage bin containing a quantity of such cartridges is disclosed in U.S. Pat. No. 3,162,322 (Gilbertson).

Mechanisms of other types representative of the state of the art are disclosed in U.S. Pat. No. 1,106,601 (Bailey), U.S. Pat. No. 2,296,154 (Elliott) and U.S. Pat. No. 2,238,725 (Fry).

SUMMARY OF THE INVENTION

The instant invention discloses an apparatus adapted for dispensing articles from a storage means. The storage means defines an inlet and an outlet and a pathway which extends therebetween. The storage means is adapted to transfer articles, introduced at its inlet, to the outlet. In a preferred embodiment, the storage means is formed by a plurality of inclined chutes arranged in a vertically stacked array. The chutes are positioned to facilitate a gravity-induced displacement of the articles to the storage means outlet subsequent to the introduction of the article to the storage means at the inlet thereof.

An elevation means for raising an article exiting the storage means outlet to a location above the outlet is associated with the storage means. The elevation means includes a vertically disposed channel means or conduit which defines an upright channel or passageway. A carriage is slidably disposed within the channel, and is adapted for upward as well as downward displacement. The carriage includes a cradle configured to receive and retain an article placed thereon. A retaining means is associated with the channel means and is adapted for engaging an article displaced upwardly within the channel beyond the retaining means. The retaining means is operative to retain the article against a subsequent downward displacement below the retaining means.

The retaining means is adapted for permitting an unobstructed upward and downward displacement thereby of the unloaded carriage through the channel. The retaining means is also adapted for facilitating an unobstructed upward displacement thereby of a carriage carrying an article to be dispensed. The retaining means is adapted to unload an article from an article loaded carriage being displaced downwardly in said channel past the retaining means. Further, the retaining means is adapted for retaining the unloaded article in a position within the channel which is elevationally above the retaining means.

DETAILED DESCRIPTION OF THE INVENTION

Figure 1:
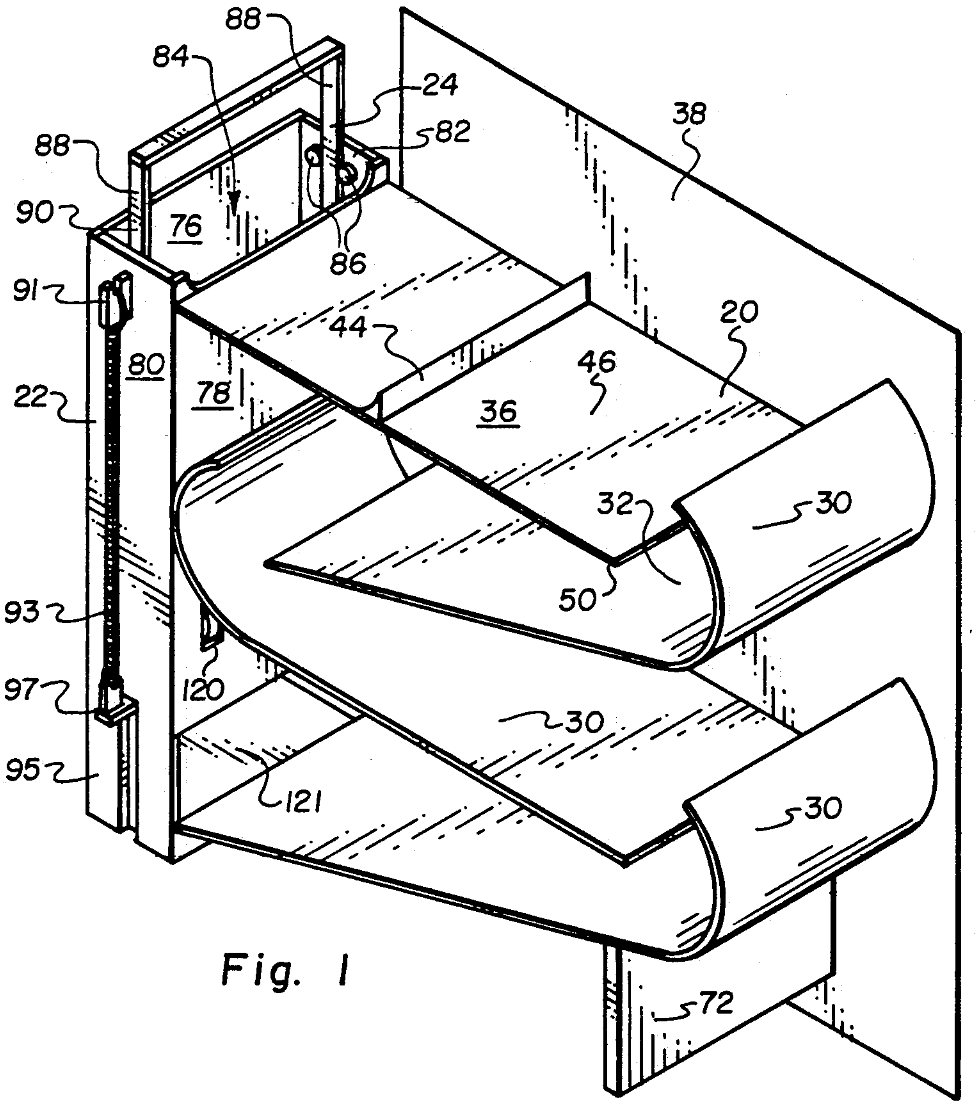
FIG. 1 is an elevated perspective view of a preferred embodiment of the invention illustrating an apparatus adapted for dispensing cylindrically-shaped cans.

The dispensing apparatus shown to advantage in FIGS. 1–7 includes a storage rack 20, a vertically disposed conduit 22 and a carriage 24 mounted slidably displaceable within the conduit 22. A retaining means 26 in the form of a pivotedly mounted finger member 28 is mounted within the conduit 22.

The Storage Rack

The storage rack 20 includes a plurality of inclined chutes 30 which are positioned relative to one another so as to define a circuitous pathway from an inlet 32 to an outlet 34. As shown, a planar panel 36 and chutes 30 are mounted to a vertically disposed support panel 38 and are each inclined to the horizon. The panel 36 is inclined such that its lowermost end 50 is positioned proximate a generally "J"-shaped chute member 48A. An elongate retaining strip 44 is mounted on the top surface 46 of panel 36 and forms a means of retaining a can which has exited the vertical conduit 22. As shown to particular advantage in FIG. 2, the panel 36 functions not only as a means of feeding the cans 47 into the inlet opening 32 of the storage rack but further functions as a holding ramp to store cans which have been lifted through the conduit 22.

Figure 2:
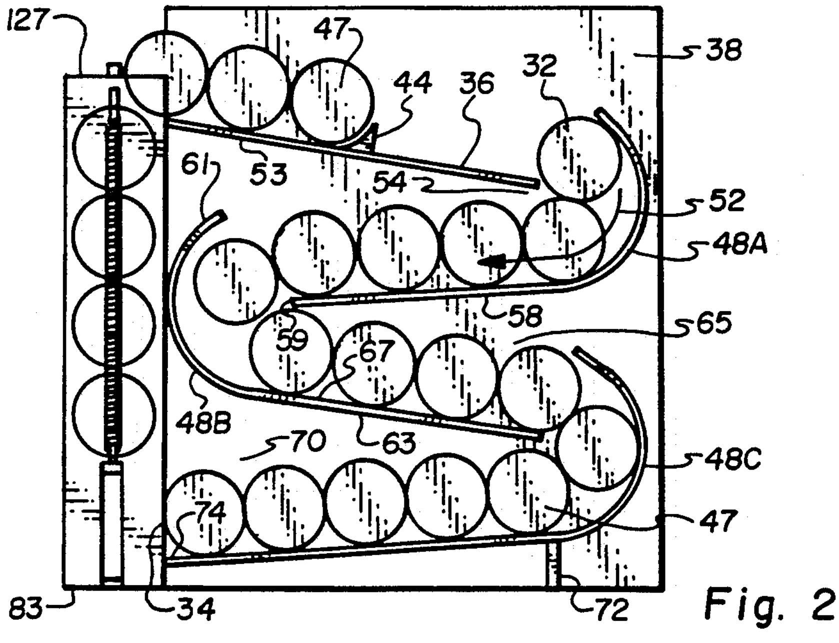
FIG. 2 is a side view of the apparatus of FIG. 1 showing a plurality of cans stored thereon.

The "J"-shaped chute 48A is mounted on panel 38 and spaced relative to the panel 36 such that a can positioned on that panel 36 can roll downward along the incline of panel 36, under the force of gravity, and pass between the end 50 of panel 36 and the inner sidewall of the chute 48A and thereafter continue along the inner surface of chute 48A in the direction indicated by arrow 52. As shown in FIG. 2, the bottom surface 53 of panel 36 and the inner surface of chute 48A forms a channel 54. The panel 36 and chute 48A are sufficiently spaced apart that the height of that channel is greater than the height of the can being stored. This spacing facilitates a rolling placement of the cans 47 along the inner surface of chute 48A. As illustrated in FIG. 2, the generally linear segment of the "J"-shaped chute indicated generally as 58 is disposed downwardly directioned to the left in contrast to the downwardly directioned incline to the right of panel 36. Positioned proximate to the distal end 59 of chute 48A is the curved proximal end 61 of a second chute 48B. The linear segment 63 of the second chute is downwardly inclined to the right in contradistinction to the left-directioned incline of the superiorly positioned linear segment 58 of the chute 48A. As described above for panels 36 and chute 48A, the chutes 48A and 48B are positioned spacedly relative to one another to define a generally "J"-shaped channel 65 of sufficient dimension to permit the passage therethrough of the cans 47. Further, the chutes 48A and 48B are sufficiently inclined that a can 47 can, under the force of gravity, roll along the upper surface 67 of the chute 48B. Similarly, a third chute 48C is mounted below chute 48B so as to form a "J"-shaped channel 70 between chute 48B and 48C. Channel 70 is inclined toward the left as shown in FIG. 2 and is dimensioned to permit the rolling passage therethrough of can 47.

The arrangement of the chutes 48 and panels 36 are positioned to form a vertical stacked array which defines a generally "S"-shaped pathway which leads from inlet 32 to outlet 34. The lowermost chute 48C has a vertically positioned support member 72 mounted on its curved section which, when mounted on an underlying support surface, functions to support that chute 48C in its inclined orientation.

The Conduit

Figure 3:
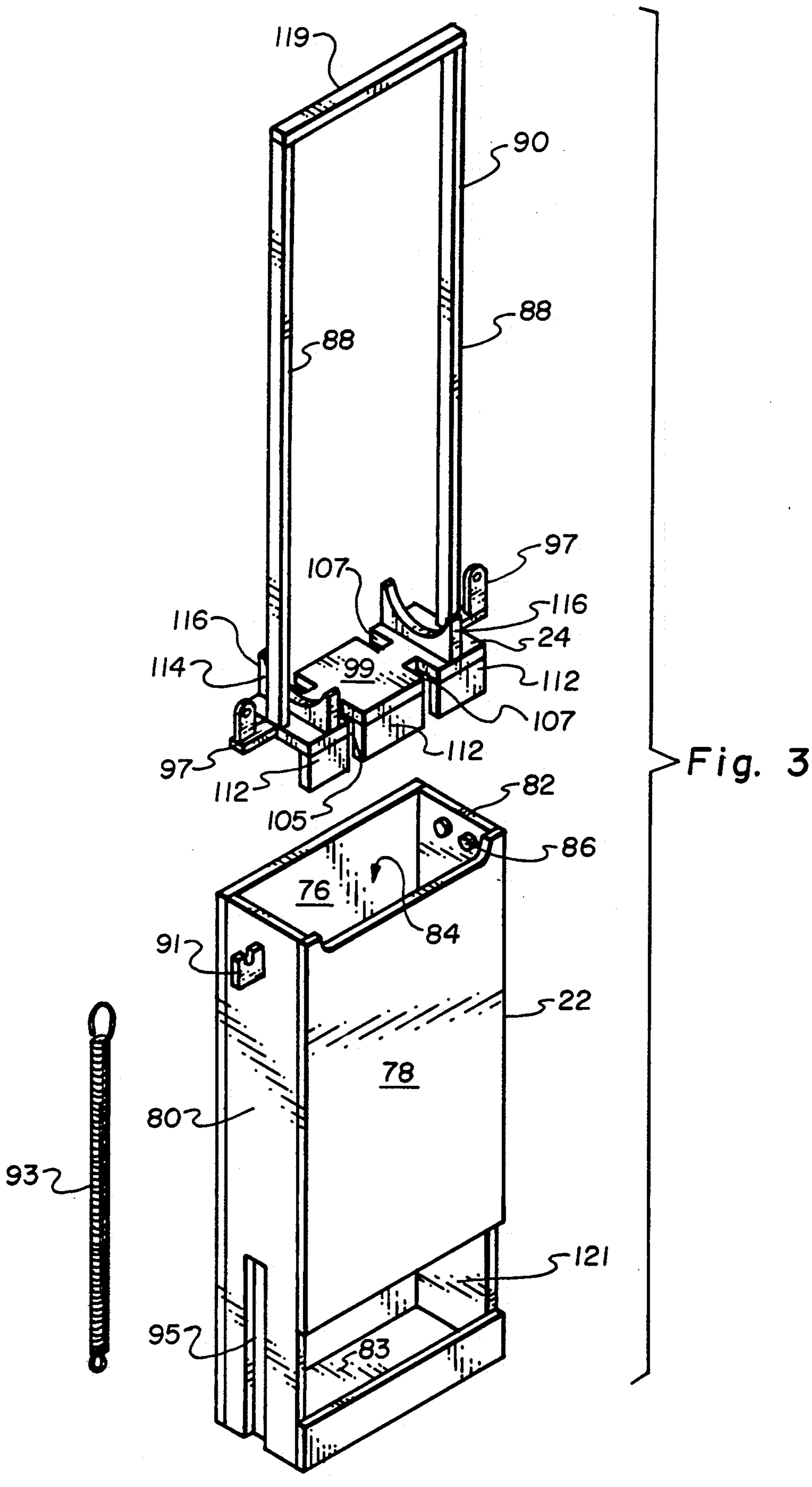
FIG. 3 is an exploded view of the vertically disposed conduit, the can carrying carriage and an associated spring of the invention.

The vertically disposed conduit 22 is mounted to the distal end 74 of the chute 48C. As shown in FIG. 3, the conduit 22 is formed of two planar panels 76 and 78 positioned spacedly from and parallel one another. A second pair of planar panels 80 and 82 are spacedly positioned parallel one another and, furthermore, these latter two panels are oriented orthogonal to the first pair of panels 76 and 78. The panels 76, 78, 80 and 82 are joined one to another along their vertical edges to form a generally rectangularly shaped box-like structure which defines a rectangularly cross-sectioned channel 84 which extends vertically upwards through the complete height of the conduit 22. A floor 83 is mounted on the bottom of panels 76, 78, 80 and 82. Channel 84 has a cross-sectional area which remains generally constant over the height of the conduit 22.

Figure 4:
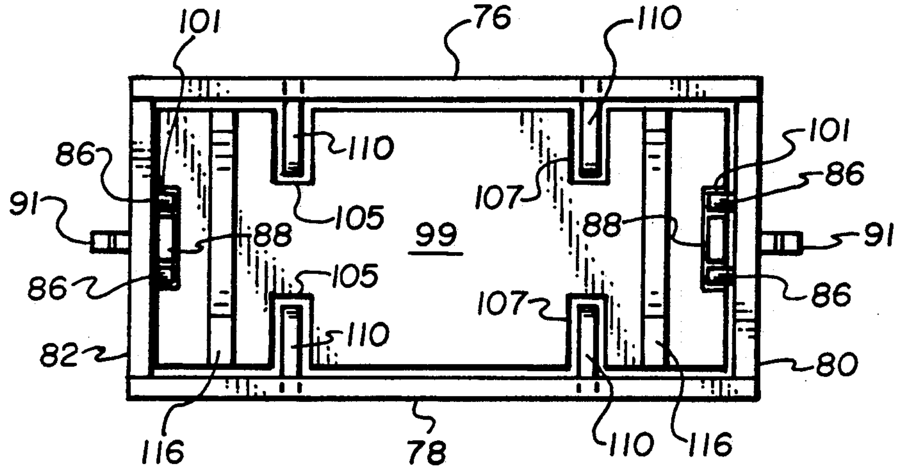
FIG. 4 is a top view of the conduit illustrating the carriage positioned thereon.

Mounted on the interior surface of the panels 80 and 82 are one or more pairs of spacedly positioned bosses 86 (FIG. 4). In each pair of bosses 86, the bosses are spaced part sufficiently to receive a respective vertically disposed shaft 88 of carriage handle 90 (FIG. 3).

Mounted on the exterior surface of each of the panels 80 and 82 proximate the respective upper end thereof is a bracket 91 slotted on its upper end to receive and retain the end of a coil spring 93. The lower end of each panel 80 and 82 defines a vertically extending slot 95. The slot 95 is dimensioned to slidingly receive a respective spring mounting bracket 97 mounted on the side of carriage 24. As shown in FIG. 1, the spring 93 extends from bracket 91 to bracket 97.

The Carriage

Figure 5:
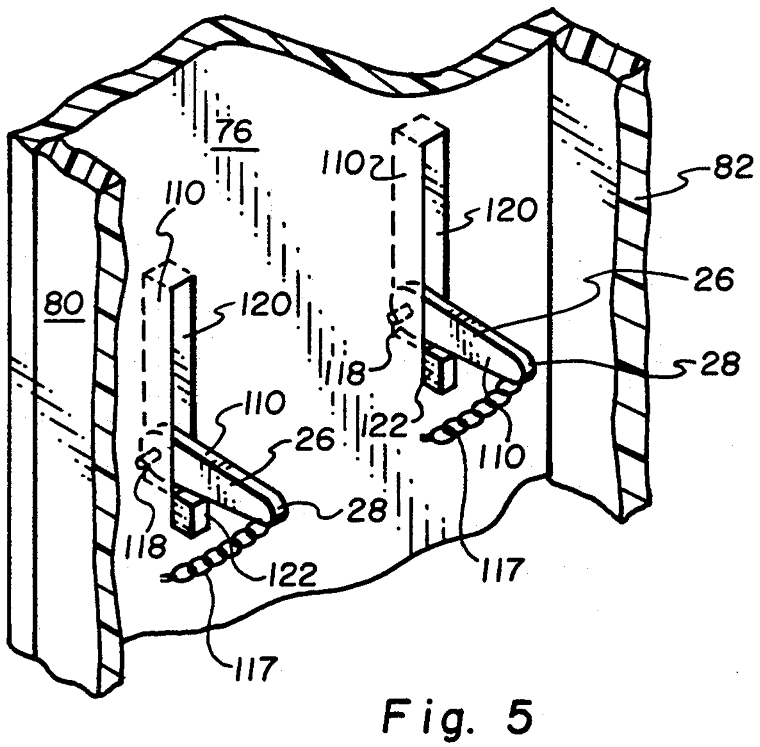
FIG. 5 is an elevated perspective view of the retaining means of the invention shown in a rest position (solid line representation) and a retracted position (dotted line representation)

Carriage 24 includes a horizontally disposed generally rectangularly shaped planar base 99 shown to advantage in FIGS. 3 and 4. The base defines a rectangularly shaped slot 101 in each of the two opposing sides thereof. The slots 101 are dimensioned to permit the base 99 to pass over bosses 86 without contacting those bosses. The base 99 also defines two pairs of elongate slots 105 and 107. Each pair of slots are positioned spacedly apart from one another across the width of the base. The slots 105 and 107 are dimensioned to permit the carriage 24 to be displaced upwardly and downwardly through channel 84 without contacting two pairs of finger members 110 which are pivotedly mounted to panels 76 and 78 and extend into channel 84 (FIG. 5).

Figure 7:
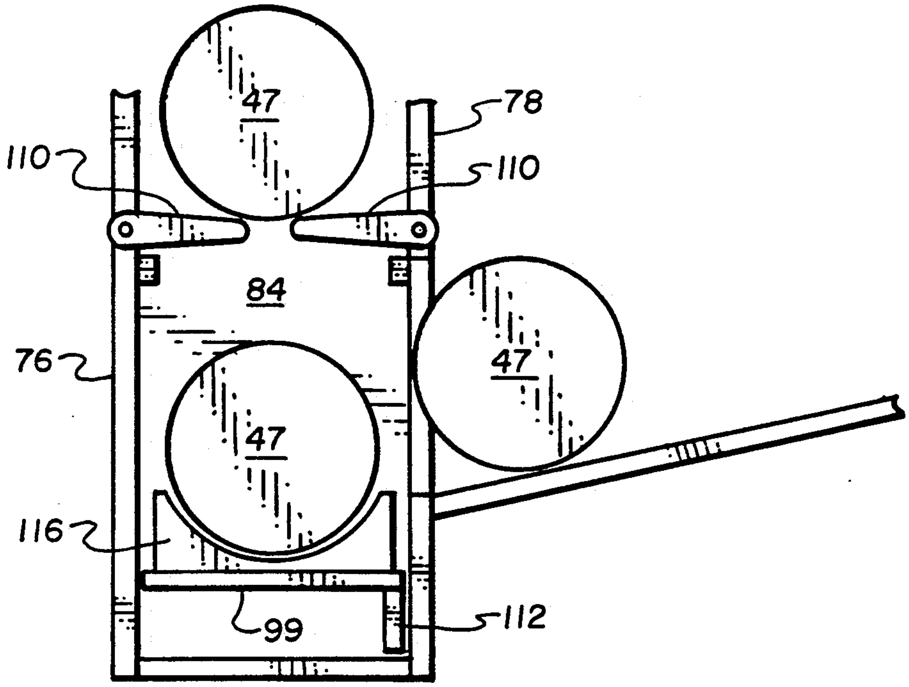
FIG. 7 is a sectional side view of the storage outlet, and the can carrying carriage in a loading orientation. The retaining means is shown in a rest condition retaining a can positioned in place thereabove.

Mounted on the lower surface of base panel 99 is a vertically disposed spacing member 112 (FIG. 3). As shown in FIG. 7, the spacing member 112 is sized to position the base panel 99 below or at most level with the distal lower end of chute 48C. This permits the user to displace the carriage 24 downward through channel 84 such that upon the support member 112 impacting against the floor 83 of the conduit 22, the base panel 99 is positioned proximate the outlet 34 of storage rack 20 such that a can 47 rolling along chute 48C's upper surface will roll onto carriage 24. The spacing member 112 is configured to register with the slots 105 and 107 in base 99 such that the slots continue through the entire width of the carriage.

Figure 6:
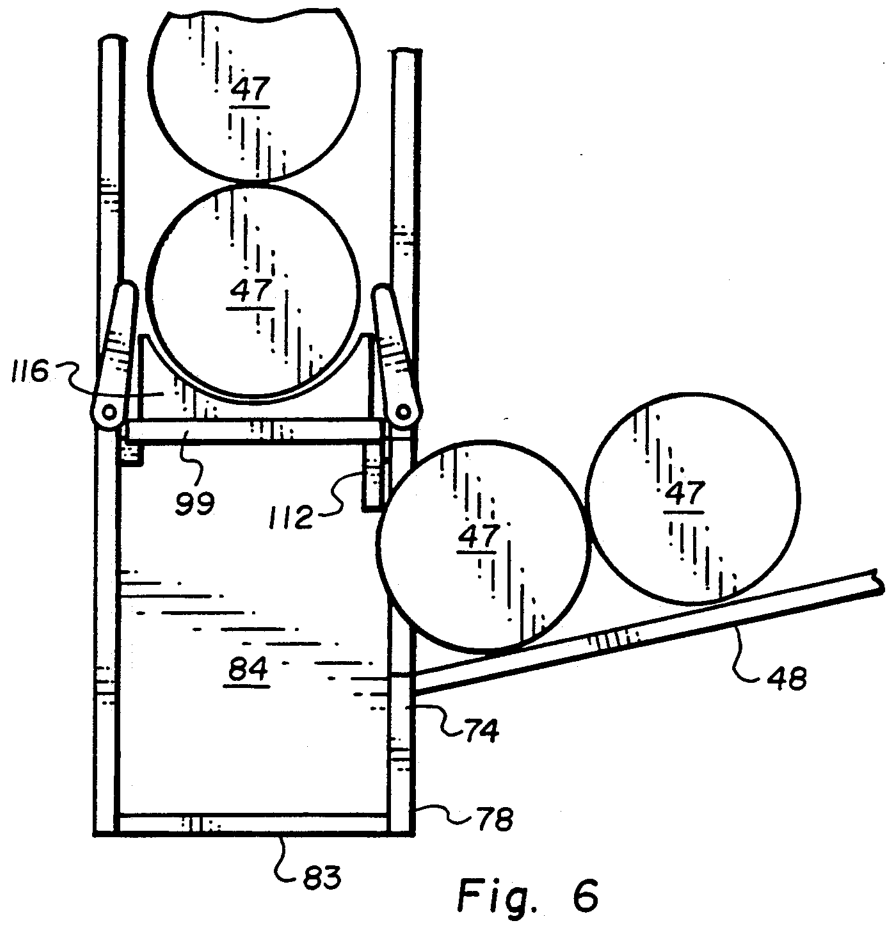
FIG. 6 is a sectional side view of the storage outlet and a can carrying carriage ascending upwardly through the vertical conduit passing said retaining means.

The base panel 99 is fitted with a cradle 114 constituted by two uprightly disposed panels 116 which are positioned spacedly apart from one another and parallel one another. Each panel 116 defines a generally semicircular top surface dimensioned to correspond to the external configuration of can 47. The two panels 116 are positioned to form a cradle-like structure adapted to receive and retain a can 47 as shown in FIGS. 6 and 7.

Mounted on top of base panel 99 are two vertically extending handle shafts 88 of handle 90 (FIG. 3). The shafts 88 are linked to one another by a horizontally positioned, hand graspable member 119. This latter member 119 permits the user to manipulate the carriage 24 and either displace it upward or downward through channel 84.

Being that the handle shafts 88 are positioned along their height between the pairs of opposing bosses 86, the shafts 88 are held in a generally vertical orientation. The bosses 86 essentially form a pair of vertically disposed tracks for the shafts 88.

Retaining Means

The retaining means mounted on conduit 22 is constituted by a plurality of finger members 110 (FIG. 5). As shown to advantage in FIGS. 4 and 5, each finger 110 is pivotedly mounted to one of the panels 76 and 78 of conduit 22 by pivot pin 118. Each of the fingers 110 is mounted within a respective vertically disposed slot 120 defined in the panel 76 and 78. Positioned below each finger 110 on the inner surface of the panels 76 and 82 is a restraining block 122 which is positioned to engage its respective finger 110 and retain that finger in a generally horizontal rest position (see FIG. 5). Slots 120 are dimensioned to receive the fingers 110 as they are pivoted about their pivot pins 118 (FIG. 6).

In some embodiments (FIG. 5), the fingers 110 may be fitted with a spring 117 which is mounted to the conduit 22 so as to urge the finger 110 into its rest condition.

Operationally, the user loads the cans 47 into the storage rack 20 by inserting the cans through inlet 32. Under the force of gravity the cans 47 roll along the surfaces of chutes 48A, 48B and 48C following along a generally "S"-shaped pathway. Upon reaching the distal end of the chute 48C and hence outlet 34, a can 47 enters the generally rectangularly shaped inlet opening 121 defined in the panel 78 of conduit 22. At this time, the user displaces the carriage 24 downward through channel 84 of conduit 22 until spacing member 112 abuts against floor 83 thereby bringing the base panel 99 and attendant cradle panels 116 into position below the distal end of the chute 48C. The can 47 rolls into position on the cradle as seen in FIG. 7. At this point, the spring 93, which has been extended due to the downward displacement of the carriage 24, urges the carriage 24 upwardly. As the carriage 24 comes into that region of the channel 84 having the fingers 110 positioned therein, the can 47 impacts against the fingers and urges them to rotate outwardly on their pivot pins as shown in FIG. 6. The carriage 24, having slots 107 and 105, is able to pass both upwards and downwards past the fingers 110 without engaging the fingers, but when the can 47 is in a loaded position on the carriage, it is positioned such that it engages the fingers 110.

The fingers 110 are rotated sufficiently outward through slots 120 that the carriage 24 and can 47 can pass through the channel 84. Once the carriage 24 and can 47 pass upwardly beyond the fingers 110, the fingers 110 are returned to the rest orientation shown in FIG. 7. Whether the return is induced solely by gravity or gravity in association with a spring 117, either way the fingers 110 are each brought into abutment against a respective restraining block 122. The can 47 is then held in place by the returned fingers 110 (see FIG. 7). The carriage 24 is then free to return downward to retrieve another can.

As further cans 47 are driven into place above the fingers 110 in channel 84, the cans 47 eventually are driven outward from the open top or end 127 of channel 84. As a can 47 exits the top 127 it is driven on to platform 36 eventually coming to rest against restraining strip 44.

It should be recognized that the description of the preferred embodiment will suggest modifications thereof. The description is intended as being merely illustrative of the principles of the invention and is not intended to restrict the scope of the claims which alone are intended to set forth the scope of the invention.

What is claimed:

1. An apparatus adapted for dispensing articles, said apparatus comprising:
- a storage means for storing articles to be dispensed, said storage means defining an inlet, an outlet and a pathway between said inlet and said outlet;
- a channel means mounted on said storage means proximate said outlet and defining a vertically disposed passageway; said channel means being adapted for receiving an article exiting said outlet;
- a displacement means mounted within said channel means for elevating said article upward through said passageway;
- a retaining means associated with said channel means for engaging said article displaced upwardly through said passageway, said retaining means including a finger member pivotally mounted on said channel means and extending into said passageway, said finger member being adapted to preclude a downward displacement of said article through said passageway after said article has been displaced upwardly past said finger member;

wherein said retaining means is adapted to permit said displacement means to be displaced upwardly and downwardly through said passageway, past said retaining means without obstruction.

2. The apparatus of claim 1 wherein said storage means is a plurality of inclined chutes arranged in a vertical array wherein said chutes are positioned to facilitate a gravity-induced displacement to said outlet of an article introduced at said storage means inlet.

3. The apparatus of claim 1 wherein said displacement means comprises a carriage having a cradle defined therein configured to receive and support an article to be elevated, said carriage including a handle to facilitate a manual downward displacement thereof.

4. The apparatus of claim 1, wherein said finger member is mounted to retain said article against downward displacement through said passageway upon said article having been displaced upwardly beyond said finger member.

5. The apparatus of claim 1, wherein said displacement means comprises a carriage having a cradle defined therein configured to receive and support said article to be elevated through said passageway, said carriage being configured to be displaceable upward and downward past said finger member without engaging said finger member, said cradle being adapted to position said article, being displaced upwardly, such that said article engages and urges said finger member out of contact with said article.

6. The apparatus of claim 5 wherein said finger member is adapted to be forcedly displaced to a rest position subsequent to an upward passage thereby of said article, said finger member in its rest position being adapted to retain said article against a subsequent downward displacement through said passageway.

7. An apparatus for dispensing cylindrically shaped cans, said apparatus comprising:
- a plurality of inclined chutes assembled in a vertical array, each said inclined chute communicating with another said inclined chute positioned proximate thereto, wherein said inclined chutes form a pathway from an inlet of a superiorly positioned said inclined chute to an outlet of an inferiorly positioned said inclined chute, said inclined chutes being positioned and adapted to facilitate a gravity-induced displacement of a can from said inlet to said outlet;
- a displacement means for elevating a can, exiting said outlet, to a location above said outlet, said displacement means comprising:
  - a conduit which is vertically disposed;
  - a carriage, slidably disposed within said conduit, and defining a cradle configured to receive a can to be elevated;
  - a handle mounted on said carriage adapted for urging said cradle downward through said conduit into a loading engagement with a can position at said outlet of said inferiorly positioned inclined chute;

a first spring means mounted on said conduit and said carriage for urging said cradle upward; and retaining means, mounted within said conduit, for retaining cans, which have been previously elevated through said conduit, at a location elevationally above said chute outlet when said carriage is displaced downwardly in said conduit.

8. The apparatus of claim 7 wherein said retaining means comprises at least one finger means pivotedly mounted to extend into said conduit sufficiently to engage a can positioned above said finger means; and a second spring means, mechanically associated with said finger means, and mounted on said conduit for urging said finger means into a position suited to retain said can above said finger means.

9. The apparatus of claim 8 wherein said carriage is configured to pass downward through said conduit without physically engaging said finger means.

10. The apparatus of claim 9 wherein said carriage is adapted to position a can loaded thereon such that said can engages said finger means upon an elevation of said can through said conduit.

11. The apparatus of claim 10 wherein said finger means is adapted to be displaced within said conduit, upon it being contacted by said upwardly ascending can, sufficiently to permit a passage thereby of said can and its carrying cradle.

12. The apparatus of claim 11 wherein said second spring means is adapted to forcedly return said finger means to a position within said conduit, subsequent to a passage thereby of an upwardly ascending can and said cradle, said finger means functioning to preclude said upwardly ascending can from being displaced downwardly past said finger means.

13. The apparatus of claim 12 wherein a second spring means is mounted on said finger means and said conduit, said second spring means being adapted to return said finger means to its said position.

14. The apparatus of claim 13 wherein said finger means is returnable to its rest position by the force of gravity.

15. An apparatus for dispensing cylindrical cans, said apparatus comprising:

a plurality of inclined chutes arranged in a vertically stacked array, each said inclined chute communicating with another said inclined chute positioned proximate thereto to define a pathway between an inlet of a top positioned said inclined chute and an outlet of a bottom positioned said inclined chute; said inclined chutes being adapted to channel a can entering said inlet to said outlet as said can is acted upon by the force of gravity;

a conduit defining a vertically disposed channel therein positioned proximate said outlet and dimensioned to receive a can exiting through said outlet;

a carriage slidably mounted within said channel for upward and downward displacement within said channel; said carriage defining a cradle configured to receive and retain a can to be transported;

a coil spring mounted on its proximal end to said carriage and on its distal end to said conduit, a downward displacement of said carriage within said channel effecting an extension of said coil spring;

a handle mounted on said carriage for facilitating a manually induced downward displacement of said carriage;

a finger member pivotedly mounted to said conduit to extend into said channel sufficiently to engage a can traveling within said channel; said finger member being pivoted to rotate about a pivot axis outward away from a can ascending through said channel to permit a passage thereby of said can, said finger member being adapted to retain in place, a can descending through said channel which contacts said finger member;

wherein said carriage is configured to avoid contacting said finger member upon said carriage's displacement upward and downward within said channel.

16. The apparatus of claim 15 wherein said finger member includes a retaining block mounted on said conduit within said channel for retaining said finger member in a rest condition adapted to retain a can positioned above said finger member in place upon said finger member engaging said retaining block.

* * * * *